Oct. 13, 1964  J. O. SULLIVAN ETAL  3,152,493
BORING BAR
Filed Feb. 24, 1960
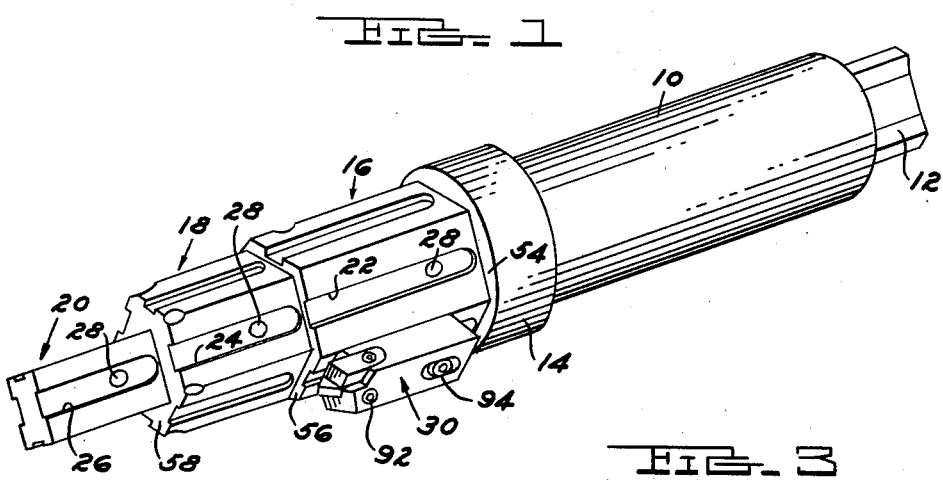
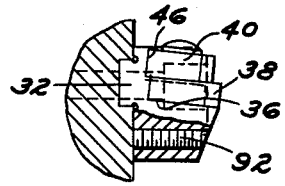
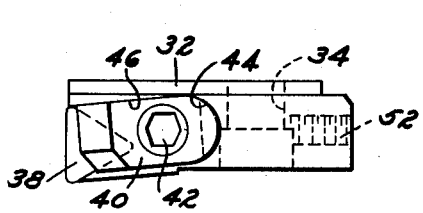
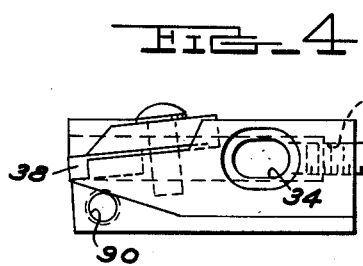
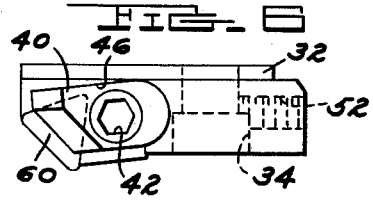
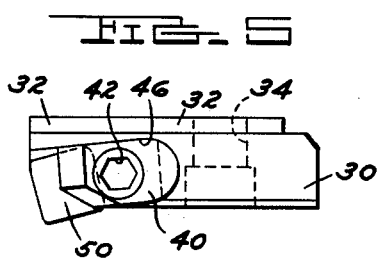
INVENTORS
JACK O. SULLIVAN
DANIEL H. VOGEL
BY
Barnes, Kisselle, Raisch & Choate
ATTORNEYS United States Patent Office 3,152,493
Patented Oct. 13, 1964

3,152,493
BORING BAR
Jack O. Sullivan and Daniel H. Vogel, Brighton, Mich., assignors, by mesne assignments, to Fansteel Metallurgical Corporation, Chicago, Ill., a corporation of New York
Filed Feb. 24, 1960, Ser. No. 10,620
1 Claim. (Cl. 77—58)

This invention relates to a boring bar formed as a composite of a special shank and individual cutting insert carriers as well as to the carrier itself which is particularly adapted for use on the boring shank.

It is an object of the invention to provide a boring bar which can make a great number of accurate simultaneous and consecutive cuts and which is also adjustable on both radial and axial dimensions.

It is an object of the present invention to provide a boring bar which is adaptable to a number of different settings for different functions and also one in which there are replaceable elements which can be used for a limited time and disposed of when new elements are obtained.

It is another object to provide a special design for the replaceable elements which makes them particularly adaptable to accurate location and which provides a solid cutting foundation for the throwaway inserts.

Other objects and features of the invention relating to details of construction and operation of the device will be apparent in the following description and claim.

Drawings accompany the disclosure and the various views thereof may be briefly described as:

FIGURE 1, a perspective view of a boring bar shank showing the locating surfaces with one of the insert bodies in position.

FIGURE 2, a sectional view of a portion of the bar showing the manner in which the insert body is located on the bar.

FIGURE 3, a plan view of a cutting body.

FIGURE 4, a side view of a cutting body.

FIGURE 5, a top view of a cutting body having a square insert as distinguished from triangular.

FIGURE 6, a view of a modified pocket locator for a triangular insert.

Referring to the drawings, the boring bar shaft consists of a cylindrical portion 10 having a drive end 12 with an enlarged collar 14. Below the collar 14 are three stepped portions 16, 18 and 20, each provided respectively with a plurality of axially aligned grooves 22, 24 and 26. Each of these grooves has in its bottom surface a threaded hole 28 for receiving a holding bolt. To be fastened in these grooves on the surfaces in which the grooves are made are small toolholder units 30 as shown, for example, in FIGURES 2 to 6. Each of the holders has a rib 32 extending along the base or one side thereof to be received in the grooves 22, 24 or 26 of the shank of the boring bar. The body 30 as shown in FIGURE 3 has a hole 34 formed therethrough which extends transversely of the rib and passes through the rib. This hole is elongated as shown in FIGURE 4 so that the body element 30 may be shifted axially of the tool in an adjustment motion. The ribs 32 are dimensioned to fit snugly in the grooves to locate the bodies 30 accurately on the shafts.

Each body element also has a pocket 36 formed therein to receive a throwaway carbide insert 38 held in place by a clamp 40 secured by a screw 42. The body element is preferably provided with a recess 44 which receives the clamp 40, the recess having side walls 46 for stabilizing the clamp in position. The clamp overlies the throwaway insert 38, which, in FIGURES 2, 3 and 4, is shown as a triangular element and which in FIGURE 5 is shown at 50 as a square element. The inserts shown in FIGURES 2, 3 and 4 are disposed at an angle of five degrees to the normal planes of the body to provide a suitable clearance angle in two directions for the insert and the work as the body positions on the shaft. This provides axial and radial clearance of the insert on the boring shaft.

In the rear of the body a threaded recess 52 is provided for a screw 53 which can be adjustably positioned at the back of the body and may rest in contact with a shoulder 54 on collar 14 or shoulder 56 or 58 between segments 16, 18 and 20, thus forming a positive axial location for the tool body element.

It will be seen that the small body holders can be provided in numerous quantity to supply the various portions of the boring bar to provide a proper number of cutting surfaces as required. Any of the normal shapes used in standard cutting tools can be adapted to the unit. For example, in FIGURE 6 a similar construction of body is shown with a triangular insert 60 positioned differently from that shown in FIGURE 3 to provide to chamfering cut.

A second radial adjustment is also permitted by the use of a threaded hole 90 which holds a screw 92 (FIGURE 1). This screw passes through the body 30 to the rib side and projects against the rib base some distance from the holding screw 94. If it is desired to move the cutting tip outwardly, that is, radially outwardly from the shaft a small degree, the screw 92 can be turned in while the screw 94 holding the body on the boring bar is loose. The screw 94 can then be tightened and the body 30 will have a different radial position to compensate for wear or to adjust for changes in design.

The adjustment of the screw 92 is not intended to materially change the dimensions of the boring bar but for the most part is used to compensate for the very first wear on the inserts as they are introduced into a boring operation. Frequently when new inserts are used, they have very sharp edges which after four or five boring operations will be removed, making a difference of maybe .001 to .002 of an inch or less in the dimension. The use of the screw 92, which is tightened just slightly to compensate for this change, does not destroy the rigidity of the holding of the body on the shaft but does not permit compensation for this initial wear or for insert variation, since it has been found that there is a slight manufacturing tolerance on the inserts themselves. After the initial adjustment, it has been found that cuts numbering from 500 to 600 can be made with the boring bar before insert change is required.

We claim:

In a boring bar combination wherein a plurality of insert carrying bodies are mounted on a boring head, that improvement which comprises a boring head of polygonal cross-section having flat chordal mounting surfaces parallel to the axis of the head, each flat surface having an axially extending groove with a base parallel to the surface and with parallel sides normal to the base of the groove, a plurality of bodies extending substantially axially on said boring bar, each body having at its end a pocket for receiving a cutting insert, a clamp on each said body for holding the said insert in said pocket, a side rib longitudinally disposed on each said body having opposed parallel sides snugly received between the sides of said groove, said body having an elongate hole transfixing the body and side rib, anchoring means in said head passing through said hole, a locating screw carried by each said body and extending axially from one said end of said body opposite said insert, a locating shoulder on said head at the end of each mounting surface to serve as a stop for said body and locating screw, and a radial adjustment screw transfixing each said body to one side of said insert pocket and longitudinally spaced from said elongate hole, said screw having an axis parallel to the sides of a groove in which a particular body is mounted and being disposed to contact at one end a portion of a chordal mounting surface wherein to adjust radially the end of each said body adjacent the insert pocket.

References Cited in the file of this patent

UNITED STATES PATENTS

| | | |
|---|---|---|
| 1,039,054 | Hartzell | Sept. 17, 1912 |
| 1,341,565 | Krepps | May 25, 1920 |
| 2,946,245 | Yogus | July 26, 1960 |
| 2,998,737 | Yogus et al. | Sept. 5, 1961 |